United States Patent [19]

Shimonou

[11] Patent Number: 5,105,399
[45] Date of Patent: Apr. 14, 1992

[54] MAGNETO-OPTICAL MEANS FOR READING DISKS BY COMPARING SIGNALS AT LEADING AND TRAILING EDGES OF LASER BEAM

[75] Inventor: Shigeru Shimonou, Tokyo, Japan

[73] Assignee: NEC Corporation, Japan

[21] Appl. No.: 581,184

[22] Filed: Sep. 10, 1990

Related U.S. Application Data

[63] Continuation of Ser. No. 202,976, Jun. 6, 1988, abandoned.

[30] Foreign Application Priority Data

Jun. 17, 1987 [JP] Japan ................ 62-151809

[51] Int. Cl.$^5$ .............. G11B 7/12; G11B 11/10; G11B 11/12; G11B 13/04
[52] U.S. Cl. .................. 369/13; 369/110; 369/124; 360/114
[58] Field of Search ............ 369/13, 110, 116, 124; 360/59, 114; 365/122; 350/405, 403, 400; 250/201 DF

[56] References Cited

U.S. PATENT DOCUMENTS

| | | | |
|---|---|---|---|
| 4,546,463 | 10/1985 | Opheij et al. | 369/110 |
| 4,721,368 | 1/1988 | Deguchi et al. | 369/110 |
| 4,837,758 | 6/1989 | Motoyama et al. | 369/13 |
| 4,847,824 | 7/1989 | Davie | 369/110 |
| 4,939,710 | 7/1990 | Fuji et al. | 369/13 |

FOREIGN PATENT DOCUMENTS

61-05459  1/1986  Japan ...................... 360/114

*Primary Examiner*—Stuart S. Levy
*Assistant Examiner*—Hoa Nguyen
*Attorney, Agent, or Firm*—Laff, Whitesel, Conte & Saret

[57] ABSTRACT

Recording medium on which information is magneto-optically recorded is irradiated with a linearly polarized light beam. A light beam reflected from or passed through the recording medium is changed in phase by a wave plate. Through an analyzer the differently polarized components of the light beam from the wave plate are combined by aligning the polarizing directions of the light beam. The light intensities of the forward and backward parts of the moving direction of the recording medium in the far field of the light beam from the analyzer are detected by a photo detector. A difference between the detected signals of the forward and backward parts is generated to reproduce the information recorded on the recording medium. Furthermore, the light beam from the wave plate is splitted into two light beams linearly polarized in mutually orthogonal directions. Two light intensities of the two light beams for the forward and backward parts of the moving direction of the recording medium in the far field of the respective light beams are detected by two photo detectors. Two differences between the outputs from the two photo detectors are determined by two subtractors. A difference or sum between the two subtractors is determined and the information is reproduced on the basis of thus determined difference or sum.

16 Claims, 3 Drawing Sheets

MAGNETO-OPTICAL MEANS FOR READING DISKS BY COMPARING SIGNALS AT LEADING AND TRAILING EDGES OF LASER BEAM

This application is a continuation of application Ser. No. 07/202,976, filed Jun. 6, 1988, now abandoned.

BACKGROUND OF THE INVENTION

The present invention relates to a magneto-optical disk reading apparatus for magneto-optically recording and reproducing information.

Magneto-optical disk reading apparatuses irradiate a recording medium consisting of magnetic material with a laser beam to thermo-magnetically record information in the variation form of magnetization on the medium, and magneto-optically read out the information by utilizing the variations in the polarization of the light reflected from or passed from the medium irradiated. They are attracting interest as highly useful filing apparatuses capable of not only permitting, like optical disk units, high-density large-capacity recording but also erasing information and reusing the medium for recording other information.

Most of such conventional magneto-optical disk reading apparatuses convert polarization variations of the light from the medium into intensity variations of the light by the use of an analyzer to read out the signals recorded on the medium. According to such signal reading, the light reflected from the part where the magnetization on the medium has varied, i.e., the part irradiated with the recording light beam at the time of recording, is either bright or dark and reproduced signals are obtained by detecting intensity variations of the whole reflected light as similar to an optical disk apparatus using a reflectance varying-type recording carrier. As methods for such detection, there have been proposed a simple method which detects the light beam having passed the analyzer with a single photodetector (an APD for instance) and a differential detecting method which detects two light beams splitted through a polarizing beam splitter by two photodetectors and determines the difference between the outputs of the two photodetectors for information reading. Both detect the variations in the total luminous energy of the light having passed the analyzer or the polarizing beam splitter, and in this respect are essentially the same as the detection of variation between bright and dark.

However, with any of the aforementioned conventional magneto-optical disk reading apparatuses, the light beam spot focused on the medium for the reading has some expanse (intensity distribution), so that the intensity of the reflected light does not vary steeply, resulting in the disadvantages that the reproduced signals tend to be inaccurate, is susceptible to the influences of the intensity variation of the irradiating light, reflectance variation of the medium and characteristics variation of the reproducing circuit, and readily invites reading errors in signal reproduction. There is the further disadvantage that, if information is to be recorded and reproduced in terms of the length variation of the region in which information is recorded in the form of magnetization changes (pulse width modulation) and if the region is detected by the intensity change of the reflected light, signal disturbance will be increased to make it impossible for information to be accurately reproduced unless the D.C. (direct current) component, or the low frequency component, is accurately amplified.

SUMMARY OF THE INVENTION

An object of the present invention is to provide a magneto-optical disk reading apparatus which has a high recording density, excels in the stability of reproduced signals and is hardly susceptible to reading errors.

Another object of the invention is to provide a magneto-optical disk reading apparatus which excels in the quality of reproduced signals, is relatively free from noise and therefore hardly susceptible to reading errors.

According to the present invention, a recording medium on which information is magneto-optically recorded is irradiated with a linearly polarized light beam. A light beam reflected from or passed through the recording medium is changed in phase by a wave plate. Through an analyzer the differently polarized components of the light beam from the wave plate are combined by aligning the polarizing directions of the light beam. The light intensities of the forward and backward parts of the moving direction of the recording medium in the far field of the light beam from the analyzer are detected by a photo detector. A difference between the detected signals of the forward and backward parts is generated to reproduce the information recorded on the recording medium. Furthermore, the light beam from the wave plate is splitted into two light beams linearly polarized in mutually orthogonal directions. Two light intensities of the two light beams at their forward and backward parts corresponding to the forward and backward moving directions of the recording medium are detected by two photo detectors. Two difference between the outputs from the two photo detectors are determined by two subtractors. A difference or sum between the two subtractors is determined and the information is reproduced on the basis of thus determined difference or sum.

Other objects and features of the present invention will be clarified from the following description with the accompanying drawings

BRIEF DESCRIPTION OF THE DRAWINGS

FIGS. 5A–5F are diagrams for explaining the principle of recorded signal reading according to the invention.

PREFERRED EMBODIMENTS OF THE INVENTION

Figure 1:
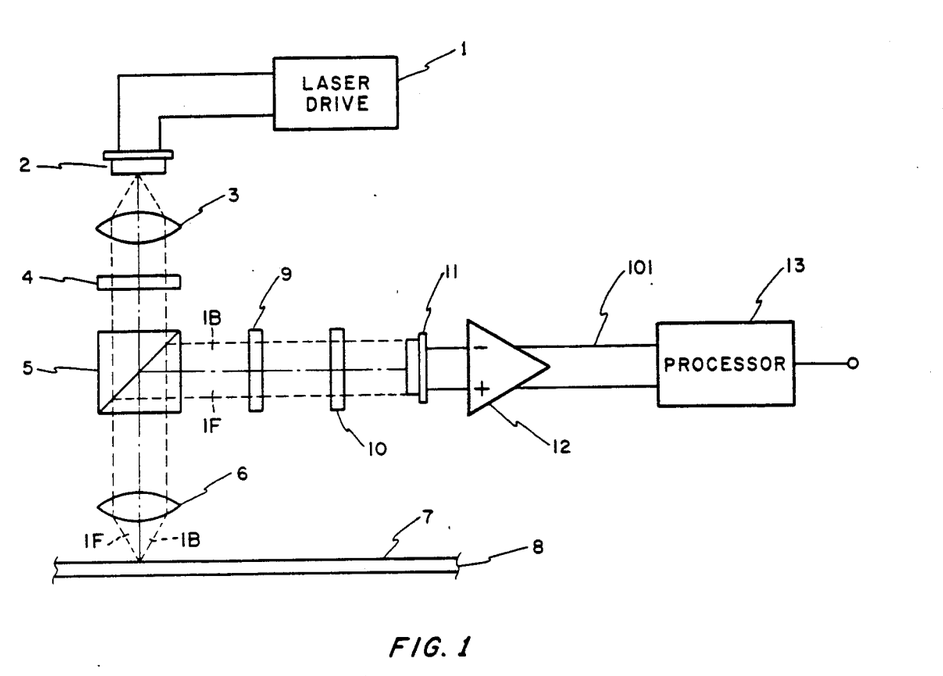
FIG. 1 is a block diagram illustrating a preferred embodiment of the present invention.

Referring to FIG. 1, a preferred embodiment of the invention includes a semiconductor laser device 2, supplied with a current from a laser driving circuit 1, for emitting a laser beam for signal reading and a collimator lens 3 for collimating the divergent laser beam emitted by the device 2 into a parallel laser beam. A polarizer 4 aligns the polarization of the laser beam in a single linear direction. A beam splitter 5, consisting of a non-polarizing half mirror for instance, is intended for separating the incident laser beam into two laser beams of a straight ahead direction and a rectangularly deviating direction. A convergent lens 6 converges the parallel laser beam, and irradiates the surface of a medium 7 on a recording carrier 8 with the converged laser beam as a tiny spot of light. Whereas the position of the convergent lens 6 relative to the medium 7 is so controlled that the tiny light spot may be well focused and formed on its prescribed position, this position control will not be explained herein as it is not directly relevant to the purpose of the present invention.

The beam focused on the surface of the medium 7 is reflected (or passed) with its polarizing direction slightly changed according to the magnetized (recording) condition of the medium 7. The beam reflected by the medium 7, with its path deflected by the beam splitter 5, passes a wave plate 9, which has a character to vary in refractive index with the polarized direction of the light beam passing it, and functions to advance (or delay) the phase of a light beam whose polarizing direction is deviated by 90°. Note that, any well known wave plate can be used as the wave plate 9, such as one that is disclosed in the U.S. Pat. No. 4,546,463 to Opheij et al. The present invention, as will be described hereinafter, utilizes the interference between light beams different in phase, and the intensity variation due to interference is the most efficient (the greatest) when the phase difference between the differently polarized beams is 90° (quarter-wave). Therefore, it is desirable to use a quarter-wave plate as the wave plate 9. In the following description, a region of the medium 7 where information is recorded will be referred to as a "recorded region". region where no information is recorded will be referred to as a "nonrecorded region[. The direction of magnetization of the recorded region is reverse so that of the non-recorded region. If the wave plate 9 is so positioned that a reflected light beam from the now recorded region of the medium 7 (this polarized beam is tentatively named the P-polarized beam) may suffer no phase deviation and a beam polarized a direction normal to the P-polarized beam (tentatively named the S-polarized beam) suffers a 90° (quarter-wave) phase delay, the beam reflected from the recorded region has a component polarized in the rectangular direction, and therefore the beam having passed the wave plate 9 has both a P-polarized beam component, which has no phase delay, and an S-polarized beam component, whose phase is delayed by 90°.

An analyzer 10 is intended for aligning different polarizing directions of beams and combining these beams. The P- and S-polarized beams, differing in phase, are combined by this analyzer 10 and interfere with each other. Whereas this interference occurs between every pair of beams differing in phase, in particular the interference between the P-polarized beam reflected from the non-recorded region and the S-polarized component of a beam reflected from the recorded region causes, when the leading or trailing edge of the recorded region is irradiated with a light spot, the beam having passed the analyzer 10 to have an intensity difference between forward and backward parts 1F and 1B of the reflected beam in the moving direction of the medium movement. A photo-detector 11, whose light receiving face is divided into forward and backward parts with respect to the moving direction of the medium, receives the beam, which has passed the analyzer 10, in the stage of being split into forward and backward directions, and supplies electric currents each corresponding to the intensity of one or the other of the incident beams. By detecting and amplifying the difference between these output currents with a differential amplifier 12, there is obtained a readout signal 101 forming a positive or negative peak when the irradiating beam hits the leading or trailing edge of the recorded region. By processing this readout signal 101 with a readout signal processing circuit 13, information recorded on the recording medium 8 is reproduced.

Figure 2:
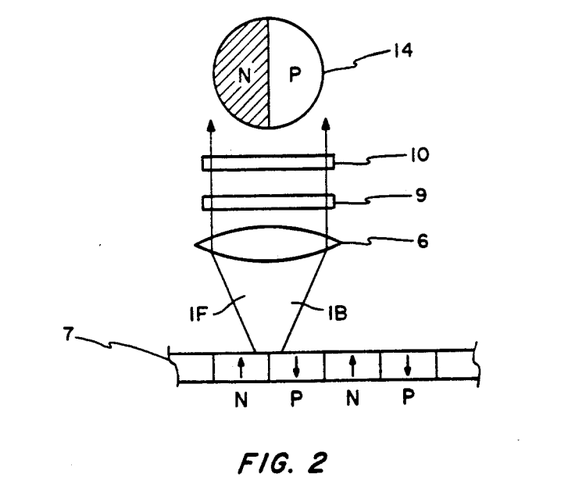
FIG. 2 is a diagram for explaining the principle of signal reading by the embodiment of FIG. 1.

FIG. 2 is a diagram for explaining the principle of recorded signal reading according to the invention. Information is recorded on the medium 7 in the form of a change (reversal) of the magnetizing direction. As the surface of the medium 7 is irradiated with light, the polarizing angle of the reflected beam is slightly deviated from that of the incident beam by the Kerr effect or the Faraday effect. The reflected light, restored into a parallel beam by the convergent lens 6, passes the wave plate 9, and the S-polarized component of the reflected light is delayed in phase behind the P-polarized component of same. If the wave plate 9 is so arranged here that only the beam reflected from the recorded region (the P region in the diagram) on the medium 7 have an S-polarized component, the beam reflected from the recorded region (the P region) having passed the wave plate 9 will have a component whose phase is behind that reflected from the non-recorded region (the N region in the diagram), which has only a P-polarized component.

This phase delay of the S-polarized component takes effect to liken the recorded region to a depressed pit. Therefore, combining by the analyzer 10 the reflected beam from the N region and the S-polarized component from the P region the same effect as the inclination of the reflected beam at the leading edge of the recorded region and an intensity difference between the forward and backward parts 1F and 1B of the reflected beam in the moving direction of the medium movement, so does the formation of a light spot on the boundary between the P and N regions result in an intensity difference in the reflected light having passed the analyzer 10 between forward and backward parts 1F and 1B. Since this intensity difference is proportional to the product of the light amplitude (the square root of intensity) of the P-polarized component from the N region and that of the S-polarized component from the P region, a greater level variation can be achieved than the intensity variation of the S-polarized component alone. A circle 14 shown in the upper part of FIG. 2 represents the distribution of brightness and darkness in the light beam having passed the analyzer 10.

Figure 3:
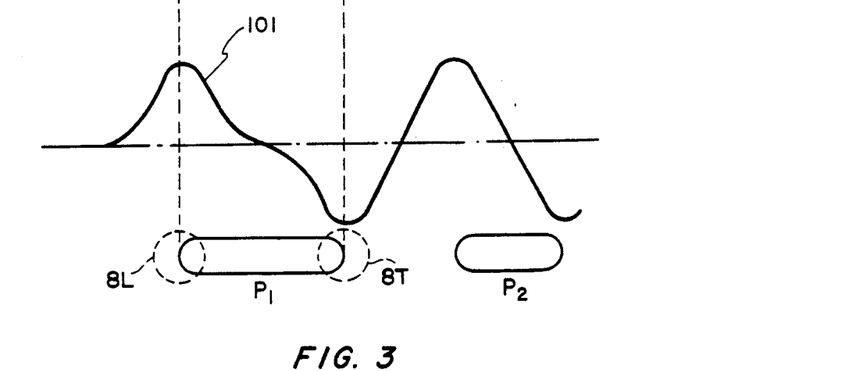
FIG. 3 is a diagram illustrating the relationship between pit positions and a readout signal in the embodiment of FIG. 1.

FIG. 3 is a diagram illustrating the relationship between magnetization of the medium 7 and a readout signal 101 in the embodiment of FIG. 1. In the figure, a waveform represents the waveform of the readout signal 101, and $P_1$ and $P_2$ denote the recorded regions. While there is no intensity difference in the light coming incident on the photodetector 11 between the forward and backward parts 1F and 1B and the readout signal 101 is at the zero level when the non-recorded region is irradiated, there does occur a forward-backward intensity difference in the light coming incident on the photodetector 11 and the readout signal 101 deviates in the positive direction when the light spot irradiates the leading edge 8L of the recorded region $P_1$. When the center of the light spot is applied on the boundary between the non-recorded part and the recording region $P_1$, the level of the readout signal 101 reaches its positive peak. When the light spot is completely within the recorded region $P_1$, there will be no forward-backward intensity difference in the light coming incident on the photodetector 11, and the level of the readout signal 101 returns to zero. When the light spot is applied on the trailing edge 8T of the recorded region $P_1$, there occurs the intensity difference in the light coming incident on the photodetector 11 in the opposite direction to what occurs when it is applied on the leading edge, and the readout signal 101 deviates in the negative direction. Since the polarity of the readout signal 101 is reversed between the leading and trailing edges 8L and 8T of the recorded region, the readout signal 101 obviously has no D.C. component, and there is no need for accurate amplification to the low frequency component. By detecting the timing of the positive and negative peaks of this readout signal 101, and the timing at which the light spot passes the leading and trailing edges 8L and 8T of the recorded region on the medium 7, information recorded on the medium 7 can be accurately extracted.

As hitherto described, according to the present invention, a wave plate and an analyzer are arranged on the path of the reflected light from the recording medium for the purpose of reading out signals recorded on a photomagnetic disk. This arrangement results in a forward-backward intensity difference in the moving direction of the medium in the far field of the reflected light having passed the analyzer when the leading or trailing edge of a recorded region, formed on the medium, is irradiated with a reading beam. By receiving this light beam with a photodetector, there is obtained a readout signal which attains a positive or negative peak when the reading beam is applied on the leading or trailing edge, respectively, of the recorded region. By detecting the timing of this peak, recorded information can be accurately reproduced without being affected by variations in light intensity or the medium's reflectance, among other factors.

The present invention has the further advantage that the readout signal has no low-frequency component, dispenses with accurate amplification of signals even to their low-frequency components, which is required in intensity variation detecting, and accordingly helps simplify the circuit composition.

Figure 4:
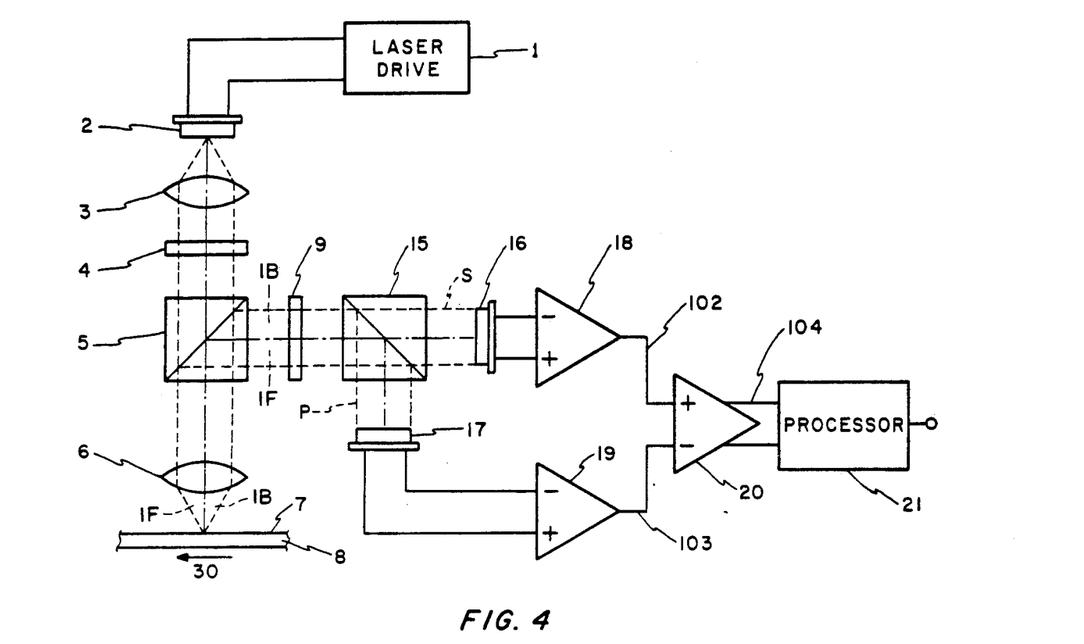
FIG. 4 is a block diagram illustrating another preferred embodiment of the invention.

FIG. 4 is a block diagram illustrating another preferred embodiment of the invention. The first embodiment illustrated in FIG. 1 reads out a signal by converting a variation in polarization due to the magnetization of the medium into a phase delay (or advance) and detecting a change in the far field pattern resulting from that phase difference. However, since the phase difference of a light beam may also result from unevenness of the medium surface, there is the disadvantage that the readout signal tends to contain much noise due to even minute irregularity on the medium surface or a slight variation in the intensity distribution of the irradiating laser beam.

FIG. 4 proposes an apparatus that represents a solution to this problem. The semiconductor laser device 2, supplied with a current from the laser driving circuit 1, emits a laser beam for signal reading. The collimator lens 3 collimates the divergent laser beam emitted by the semiconductor laser device 2 into a parallel laser beam. The polarizer 4, intended for aligning polarization of the laser beam in a single linear direction, may be dispensed with because a light beam emitted by the semiconductor laser device 2 is usually polarized linearly and therefore the prescribed performance characteristics can be achieved without it. The half mirror 5, which may consist, for instance, of a non-polarizing half mirror which transmits a part of a light beam coming incident irrespective of the polarized condition and reflects another part in the rectangular direction, is intended for splitting a part of the reflected light from the path of the incident light. The object lens 6 focuses the incident light beam having passed the half mirror 5, and irradiates the surface of the recording medium 7 on the recording carrier 8 with the focused light beam as a tiny spot of light. The beam irradiating the surface of the recording medium 7 is reflected (or transmitted) with its polarized direction slightly changed according to the magnetized condition (the recording condition) of the medium 7.

The medium 7 is magnetized in its information recording part (recorded region) in a single direction normal to the medium surface, and in the erased part (non-recorded region) in the direction reverse to that in the recorded region. When the medium 7 is irradiated with a linearly polarized beam, the reflected or transmitted(passed) beam is inclined (rotated) by the Kerr effect or the Faraday effect in the polarizing direction with respect to the incident beam. This rotation of linearly polarized light is known as optical rotation, and can be explained by the phase advance and delay corresponding to clockwise and counterclockwise circular polarization, but for the sake of simplicity it may be regarded as the rotation of linearly polarized light.

The beam reflected from the medium 7 is restored into a parallel beam by the object lens 6. The intensity distribution of this beam magnified and collimated by the object lens 6 is known as the far field pattern. A part of the reflected light having passed the object lens 6 is reflected, with its path turned rectangularly, by the half mirror 5, and directed toward the quarter-wave plate 9. The quarter-wave plate 9 has a character to delay, relative to a beam linearly polarized in a certain direction (normal beam), the phase of another beam linearly polarized in a direction orthogonal thereto (abnormal beam) by 90° (equivalent to a quarter wavelength), and usually used for converting a linearly polarized beam into a circularly polarized beam or a circularly polarized beam into a linearly polarized beam. In this instance, where the reflected light from the medium 7 coming incident on the quarter-wave plate 9 is linearly polarized, it will be easier to understand if the quarter-wave plate 9 is supposed to be so arranged as to convert the linearly polarized beam into a circularly polarized beam, and therefore such an example is given, but the quarter-wave plate 9, as will be explained afterwards, need not be so arranged as to convert the linearly polarized beam reflected from the medium into a circularly polarized beam, and instead may be arranged at any desired inclination (rotational angle).

The light having passed the quarter-wave plate 9 is, for instance, circularly polarized and can be regarded as that resulting from the combination of two linearly polarized beams orthogonal to each other. A polarizing beam splitter 15 splits the light having passed the quarter-wave plate 9 into two linearly polarized and mutually orthogonal beams (for instance S-polarized and P-polarized beams) and substantially equal amplitudes (or intensities). In order to substantially equalize the amplitudes (or intensities) of these split light beams, it is necessary that the polarizing directions (S-polarization and P-polarization) of the two beams be approximately 45° off the polarizing direction of the normal beam (or the abnormal beam) at the quarter-wave plate. Therefore, if the polarizing direction of the normal beam of the quarter-wave plate 9 (i.e. the direction of optical axis of the quarter-wave plate) is, for instance 45° off the direction of linear polarization of the reflected light (at this time the light having passed the quarter-wave plate 9 is substantially circularly polarized), the polarizing beam splitter 15 should be so arranged as to make the polarizing directions of the light beams split by the polarizing beam splitter 15 equal to directions 45° further off the polarizing direction of the normal beam (or the abnormal beam), i.e. that of the reflected light (or the direction orthogonal thereto).

If the relationship between the polarizing direction of the normal beam at the quarter-wave plate 9 and those of the light beams split by the polarized beam splitter 15 (45° off each other) is satisfied, the inclination (rotational angle) of the quarter-wave plate 9 or the polarizing beam splitter 15 may be set as desired. As the polarizing beam splitter 15, there may also be usable, a Wollaston polarizing prism or some other polarizing beam splitter which slightly shifts or bends the paths of the two split beams with respect to each other.

As the polarizing beam splitter 15 functions to align the polarized conditions of the light beams it emits in a common direction (analyzing action) as well as splitting of the incident beam, the beams having passed the polarizing beam splitter and differing in phase interfere with each other.

The actions of the above described quarter-wave plate and polarizing beam splitter convert the change in polarization (rotation) by the magnetization of the recording medium 7 into a phase deviation of a light beam. For instance, if the magnetization of the recorded region slightly rotates the polarizing angle of the reflected light from the recorded region clockwise, the S-polarized component coming out of the polarizing beam splitter 15 is slightly advanced in phase. In the non-recorded region where the direction of magnetization is reverse, the polarizing angle of the reflected light from it is slightly rotated counterclockwise, contrary to that from the recorded region, and the S-polarized component from the polarizing beam splitter 15 is slightly delayed in phase.

This relationship is reversed for the P-polarized beam from the polarizing beam splitter 15. Thus, immediately after the polarizing beam splitter 15, the difference in polarizing angle between the reflected beams from the recorded region and the non-recorded region results in a phase difference between the two reflected components. This phase relationship is reversed between the two beams (S-polarized and P-polarized) resulting from splitting by the polarizing beam splitter 15.

For instance, viewed from the S-polarized beam (directed toward a photodetector 16) having come out of the polarizing beam splitter 15, the phase of the reflected beam from the recorded region looks ahead of that of the reflected light from the non-recorded region, and the recorded region appears to be convex. On the other hand, viewed from the P-polarized beam (directed toward a photodetector 17), the phase of the reflected beam from the recorded region looks behind, and the recorded region, appears to be concave. Thus, where the recording region appears to be convex or concave depending on how it is viewed, or in the presence of a phase difference between the beams reflected from the recorded region and from the non-recorded region, there occurs a light intensity difference between the forward and backward in the moving direction of the medium in the far field of the reflected beam (or the transmitted beam) at the recorded region edge of the recorded region. Recorded information can be detected, as was described with reference to FIG. 1, by receiving such beams with a divided photodetector.

The two light beams (S-polarized and P-polarized) resulting from splitting by the polarizing beam splitter 15 come incident on the photodetectors 16 and 17, respectively, whose light receiving faces are divided into at least two forward and backward parts 1F and 1B each in the moving direction of the medium (indicated by an arrow 30 in FIG. 4), and which receive, divided into forward and backward parts 1F and 1B the far field patterns of the light beam reflected from the medium 7 and coming out of the polarizing beam splitter 15 and supply currents, each corresponding to the intensity of one or the other of the incident beams.

When the leading edge of the recorded region is irradiated with a reading beam, the area ahead of the far field of the reflected beam will become bright if the recorded region is regarded as convex, or that behind the far field will, if the recorded region is regarded as concave. In the structure of this embodiment, therefore, if the leading edge of the recorded region is irradiated, the part ahead (the lower part in FIG. 4) of the photodetector 16 will receive a greater quantity of light, and so will the part behind (the right hand side in FIG. 4) of the photodetector 17.

A differential amplifier 18 receives output currents from the forward and backward parts 1F and 1B into which the photodetector 16 are split, amplifies the difference between them, and outputs it as an intensity differential signal 102. In the above described instance, this intensity differential signal 102 forms a positive peak at the leading edge and a negative peak at the trailing edge of the recorded region. Meanwhile, another differential amplifier 19 takes a similar action on the photodetector 17, and outputs another intensity differential signal 103. In the above described instance, this intensity differential signal 103, forming a negative peak at the leading edge of the recorded region, is reverse in polarity to the intensity differential signal 102. A subtracting circuit 20 adds the information contents of these two intensity differential signals 102 and 103 (the peaks at the leading and trailing edges of the recorded region) in the form of taking the difference between the two signals, amplifies the sum and outputs it as a readout signal 104. As is obviously understood, if the connection of the differential amplifier 18 or 19 to the photodetector 16 or 17 is inverse, an adding circuit can be used in place of the subtracting circuit 20. By reading the readout signal 104 supplied by this subtracting circuit 20 and processing it with a signal processing circuit 21, information recorded on the recording medium 7 is reproduced.

As intensity variations in the forward and backward region due to the magnetization of the medium 7, in the reflected beams coming incident on the photodetectors 16 and 17 are reverse in polarity with each other, and the readout signal 104 is obtained in the form of taking the difference between these variations, noise of the same phase resulting from variations in the medium's reflectance, the power of the irradiating laser beam and so forth is kept to the minimum. Meanwhile, intensity variations in the forward and backward directions in the reflected light due to the surface irregularities of the medium 7 convexes or concaves on the medium surface or variations in the light intensity distribution of the irradiating laser beam, unlike those due to magnetization, are the same in phase between the photodetectors 16 and 17. Accordingly, by figuring out the difference between the intensity differential signals 102 and 103, the intensity variations in the forward and backward directions in the reflected light due to these non-magnetization factors is canceled, and only the variations in the polarization of the reflected light due to magnetization, or the recorded information, are accurately taken out, resulting in low-noise high-quality reproduction of desired signals.

FIG. 5, intended for explaining the principle of recorded signal reading according to the invention, is a vector diagram schematically illustrating how the optical activity (rotation of a linearly polarized beam) due to the Faraday effect or Kerr effect is converted into a phase advance or delay as the beam passes the quarter-wave plate 9 and the polarizing beam splitter 15. In FIG. 5(A), the V direction represents the polarization vector of the linearly polarized beam, to which corresponds, for instance, the polarization of the reflected beam from the non-recorded part of the recording medium 7. The amplitude vector of this beam is represented by $E_o = \cos\omega t$.

Figure 5A:
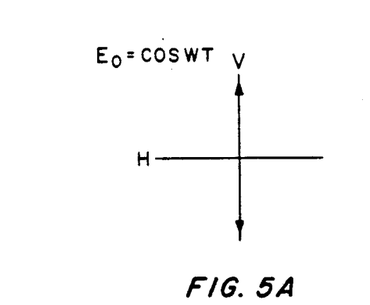
Figure 5B:
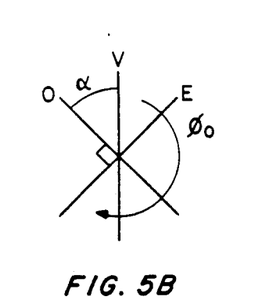

FIG. 5(B) illustrates the polarization vector of the linearly polarized beam shown in FIG. 5(A) after having passed the quarter-wave plate 9. With $\alpha$ representing the angle at which the direction O in which the quarter-wave plate 9 polarizes the normal light is changed into the S-polarizing direction, a linearly polarized beam $E_o$ coming incident with $\alpha$ is 45° passes it, converted into a counterclockwise circularly polarized beam. The amplitude of this passing beam being represented by $\phi_o$, this $\phi_o$ delays by $$\frac{\pi}{2} (90°)$$

the phase of only the abnormal light component $$E_{oe} = \sin\alpha \cdot e^{-i\left(\frac{\pi}{2} - \alpha\right)}$$

$\cos\omega t$ of $E_o$, but not its normal light component $E_{oo} = \cos\alpha e^{i\alpha}\cos\omega t$, so that $$\phi_O = \cos\alpha \cdot e^{i\alpha} \cdot \cos\omega t + \sin\alpha \cdot e^{-i\left(\frac{\pi}{2} - \alpha\right)} \cdot \cos\left(\omega t - \frac{\pi}{2}\right)$$

and this can be rearranged into $$\phi_O = e^{i\alpha}(\cos\alpha \cdot \cos\omega t - i \cdot \sin\alpha \cdot \sin\omega t)$$
$$= e^{i\alpha}\left(\frac{\cos\alpha - \sin\alpha}{2} e^{i\omega t} + \frac{\cos\alpha + \sin\alpha}{2} e^{-i\omega t}\right)$$

Supposing $\alpha = (45°)$ here, $\phi_o = e^{i\alpha}\frac{\sqrt{2}}{2} e^{-i\omega t} = \frac{1}{\sqrt{2}} e^{-i(\omega t - \alpha)}$, which means counterclockwise circular polarization, so that it is demonstrated that the quarter-wave plate 9, whose direction of polarizing the normal light is 45° inclined, converts a linearly polarized beam into a circularly polarized beam.

Figure 5C:
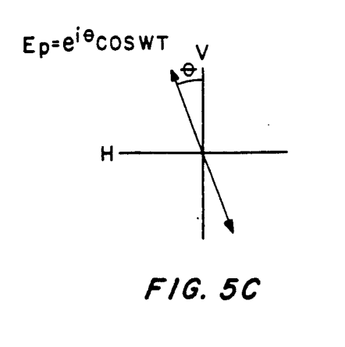

Meanwhile FIG. 5(C) illustrates the polarization of a beam whose polarizing angle is inclined by $\theta$ with respect to the V direction, to which corresponds, for instance, the reflected beam from the magnetized pit (recording part) of the recording medium 7. The vector of this linearly polarized beam is represented by $E_p = e^{i\theta} \cdot \cos\omega t$. FIG. 5(D) illustrates the polarization vector of the linearly polarized beam shown in (C) after having passed the quarter-wave plate 9, whose direction of polarizing the normal light is inclined, like in (B), by $\alpha$ with respect to the V direction. This amplitude vector being represented by $\phi_p$, the phase of only the abnormal light component $$E_{pe} = \sin(\alpha - \theta) \cdot e^{-i\left(\frac{\pi}{2} - \alpha\right)} \cdot \cos\omega t \text{ of } E_p,$$

but not its normal light component $E_{oo} = \cos(\alpha - \theta) \cdot e^{i\alpha} \cdot \cos\omega t$ is delayed by $$\frac{\pi}{2} (90°),$$

so that $$\phi_p = \cos(\alpha - \theta) \cdot e^{i\alpha} \cdot \cos\omega t + \sin(\alpha - \theta) \cdot$$

$$e^{-i\left(\frac{\pi}{2} - \alpha\right)} \cdot \cos\left(\omega t - \frac{\pi}{2}\right)$$

and this can be rearranged into $$\phi_p = e^{i\alpha}(\cos(\alpha - \theta) \cdot \cos\omega t - i \cdot \sin(\alpha - \theta) \cdot \sin\omega t)$$
$$= e^{i\alpha}\left(\frac{\cos(\alpha - \theta) - \sin(\alpha - \theta)}{2} \cdot e^{i\omega t} + \frac{\cos(\alpha - \theta) + \sin(\alpha - \theta)}{2} \cdot e^{-i\omega t}\right)$$

Figure 5E:
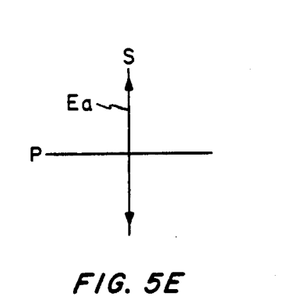

Supposing $\alpha = (45°)$ and Q is small here, $\phi_p$ will also means counterclockwise circular polarization substantially like $\phi_o$. FIG. 5(E) illustrates the amplitude vector of what has an S-polarized component out of the two light beams into which the polarizing beam splitter 10 splits the incident beam thereon.

FIG. 5(F) illustrates the amplitude vector of the other split beam which has a P-polarized component. The S-polarized beam from the polarizing beam splitter 15 forms an angle of $$-\frac{\pi}{4} (-45°)$$

with respect to the normal light direction (O direction) of the quarter-wave plate 9. Therefore the S-polarized beam from the polarizing beam splitter 15 forms an angle of $$\left(\alpha - \frac{\pi}{4}\right)$$

with respect to the V direction in which the reflected beam from the non-recorded part, shown in FIG. 5(A), is polarized. As will be readily understood, where $$\alpha = \frac{\pi}{4} (45°),$$

the V direction is the same as the S direction. When a light beam having an amplitude (polarization) vector $\phi$ comes incident on the polarizing beam splitter 15, which splits an incident light beam into two beams, one S-polarized in the direction of the $$\left(\alpha - \frac{\pi}{4}\right)$$

angle and the other P-polarized in the direction, orthogonal to it, of the $$\left(\alpha + \frac{\pi}{4}\right)$$

angle, the amplitude vector of the S-polarized component is $$E_a = e^{i\left(\alpha - \frac{\pi}{4}\right)} \cdot Re(e^{-i\left(\alpha - \frac{\pi}{4}\right)}\phi)$$

(where Re(Z) represents the real number component of Z), and that of the P-polarized component $$E_b = e^{i\left(\alpha + \frac{\pi}{4}\right)} \cdot Re(e^{-i\left(\alpha + \frac{\pi}{4}\right)}\phi).$$

Therefore, after the light beam with an amplitude vector of $\phi_o$, resulting from the passage of the quarter-wave plate 9 by the reflected beam from the non-recorded part, passes the polarizing beam splitter 15, the amplitude of its S-polarized component is $$E_{ao} = e^{i\left(\alpha - \frac{\pi}{4}\right)} \cdot Re\{e^{-i\left(\alpha - \frac{\pi}{4}\right)} \cdot e^{i\alpha} (\cos\alpha \cdot \cos\omega t - i \sin\alpha \cdot \sin\omega t)\}$$

$$= e^{i\left(\alpha - \frac{\pi}{4}\right)} \left(\cos\frac{\pi}{4} \cdot \cos\alpha \cdot \cos\omega t + \sin\frac{\pi}{4} \cdot \sin\alpha \cdot \sin\omega t\right)$$

$$= e^{i\left(\alpha - \frac{\pi}{4}\right)} \cdot \frac{1}{\sqrt{2}} \cos(\omega t - \alpha)$$

and that of its P-polarized component is $$E_{bo} = e^{i\left(\alpha + \frac{\pi}{4}\right)} \cdot Re\{e^{-i\left(\alpha + \frac{\pi}{4}\right)} e^{i\alpha} (\cos\alpha \cdot \cos\omega t - i \cdot \sin\alpha \cdot \sin\omega t)\}$$

$$= e^{i\left(\alpha + \frac{\pi}{4}\right)} \cdot \frac{1}{\sqrt{2}} \cos(\omega t + \alpha)$$

On the other hand, for the light beam with an amplitude vector of $\phi_p$ resulting from the passage of the quarter-wave plate 9 by the reflected beam from the recorded region (magnetized recording part), the amplitude of the S-polarized beam, one of the two beams into which it is split by the polarizing beam splitter 15, is $$E_{ap} = e^{i\left(\alpha - \frac{\pi}{4}\right)} \cdot \frac{1}{\sqrt{2}} \cos(\omega t - \alpha + \theta)$$

and that of P-polarized beam is $$E_{bp} = e^{i\left(\alpha - \frac{\pi}{4}\right)} \cdot \frac{1}{\sqrt{2}} \cdot \cos(\omega t + \alpha - \theta)$$

These equations reveal that, out of the beams resulting from splitting by the polarizing beam splitter 15, the S-polarized beam has its component $E_{ap}$, attributable to the reflected beam from the recorded region, ahead of the component $E_{ao}$, attributable to that from the non-recorded part, by $\theta$ in phase. It is seen that, in the P-polarized beam on the other hand, the component $E_{bp}$, attributable to the reflected beam from the recorded region, is behind the component $E_{bo}$, attributable to that from the non-recorded part, by $\theta$ in phase. Thus, viewed from the S-polarized beam, the recorded region appears to be convex, while it appears to be concave viewed from the P-polarized beam. It may also be readily understood that this relationship holds irrespective of the degree of $\alpha$, the diagrammatic angle of the quarter-wave plate 9. Thus in each of the two light beams resulting from splitting by the polarizing beam splitter 15, there occurs a phase difference between the reflected beam from the recorded region and that from the non-recording part, with the result that there arises a light intensity difference between the forward and backward parts, in the moving direction of the medium, of the far field of the reflected beam at the (leading or trailing) edge of the recorded region. Recorded information can be detected by receiving these beams with photodetectors, which are divided as described above, and thereby detecting the forward-backward variation of light intensity.

Figure 6:
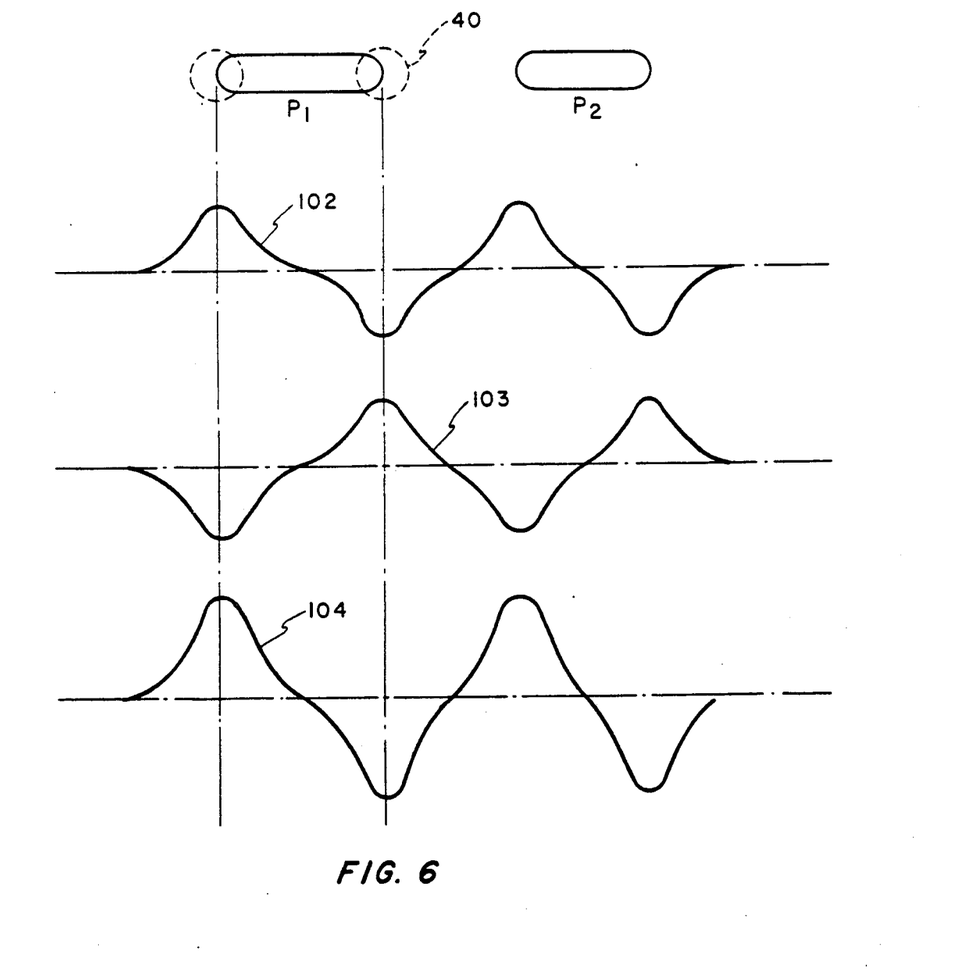
FIG. 6 is a diagram illustrating the relationship between pit positions and readout signals in the embodiment of FIG. 4.

FIG. 6 is a diagram illustrating the relationship between the phases of the recorded regions and the readout signal 104 in the embodiment illustrated in FIG. 4. In the diagram, $P_1$ and $P_2$ represent pits (recording parts), and the waveforms of the intensity differential signal 102, the other intensity differential signal 103 and the readout signal 104, respectively.

When a light spot 40 is irradiating a non-recorded region, the beams coming incident on the photodetectors 16 and 17 have no forward-backward intensity differences and both intensity differential signals 102 and 103 are at the zero level, but when the light spot 40 hits the leading edge of the recorded region $P_1$, the beams coming incident on the photodetectors 16 and 17 come to have the intensity differences, and the intensity differential signals 102 and 103 deviate in the positive and negative directions, respectively. After that, when the light spot 40 fully enters the recorded region $P_1$, the beams coming incident on the photodetectors 16 and 17 no longer have intensity differences, and both intensity differential signals 102 and 103 return to the zero level.

When the light spot 40 hits the trailing edge of the recorded region, the beams coming incident on the photodetectors 16 and 17 come to have the intensity differences in the reverse direction to what occurred when the light spot 40 was on the leading edge, and the intensity differential signals 102 and 103 deviate in the negative and positive directions, respectively. As the polarities of the intensity differential signals 102 and 103 are contrary between the leading and trailing edges of the recorded region, these signals have no D.C. components, and therefore need not be accurately amplified to the low frequency region. By taking and amplifying the difference between these two intensity differential signals 102 and 103, there is obtained the readout signal 104 which attains a positive peak at the leading edge and a negative peak at the trailing edge of the recorded region. Nor does this readout signal 104, which essentially has no D.C. component, need be accurately amplified to the low frequency region.

Forward-backward intensity variations of the reflected beams due to other factors than the recorded region (magnetization), including slight convexes and concaves on the medium surface or variations in intensity distribution of the irradiation laser beam, occur in a common direction to the beams coming incident on the photodetectors 16 and 17, and therefore these variations are reflected on the intensity differential signals 102 and 103 as variations in the same direction (polarity). As the readout signal 104 is obtained in the form of taking the difference between the intensity differential signals 102 and 103, these variations in the same direction cancel each other. Therefore the readout signal 104 accurately catches only the variations of the reflected beam due to the recorded region (magnetization), and variations due to other factors (noise) are kept to the minimum.

As hitherto described, according to the present invention, there are arranged on the path of the light beam reflected or transmitted by a recording medium, for the purpose of reading out signals recorded on a photomagnetic disk, a quarter-wave plate, a polarizing beam splitter, and divided photodetectors, one for each of the two light beams resulting from splitting by the polarizing beam splitter. By detecting the forward-backward intensity difference of the beam coming incident on each photodetector and further by subjecting the intensity difference signals detected by the two photodetectors to subtraction or addition, there is obtained a readout signal which attains a positive or negative peak when the beam hits the leading or trailing edge of the recorded region. This arrangement has the benefit of accurately reproducing recorded information without being affected by variations in light intensity or the medium's reflectance, which posed problems to prior art apparatuses. The apparatus according to the present invention has the additional advantage that the readout signal has no low frequency component and there is no need for accurate signal amplification to the low frequency region. The invention also makes it possible to eliminate noise due to other factors than recorded information including slight unevenness of the medium surface and changes in the intensity distribution of the irradiating laser beam, and thereby to provide low-noise high-quality readout signals.

What is claimed is:

1. A magneto-optical disk reading apparatus comprising:

irradiating means for irradiating a beam spot on a leading edge and a trailing edge of a recorded bit on a recording medium with a linearly polarized light beam, said leading and trailing edges being taken with respect to the moving direction of said recording medium having information magneto-optically recorded thereon in the form of successive recorded and non-recorded regions;

a wave plate for passing a reflected light beam, said wave plate being arranged in only a path of a reflected or transmitted light beam reflected or transmitted from said beam spot on said recording medium, for changing relative phases of differently polarized components of a polarized light beam in said reflected or transmitted light beam from said beam spot;

analyzer means for combining said differently polarized components by aligning the polarizing directions of said differently polarized components of said polarized light beam from said wave plate to produce an aligned light beam;

photodetector means responsive to said aligned light beam for detecting light intensities of said aligned beam at forward and backward positions reflected or transmitted from forward and backward parts of said beam spot, said forward and backward parts being taken with respect to the moving direction of said recording medium; and subtracting means responsive to said photodetector for generating a difference signal representing differences in the light intensities between said forward and backward positions so as to detect data information on said recording medium when a part of said beam spot hits the trailing or leading edge of each of said recorded regions.

2. A magneto-optical disk reading apparatus according to claim 1, wherein said wave plate is a quarter-wave plate.

3. A magneto-optical disk reading apparatus according to claim 1, wherein said photodetector is divided into two portions for detecting said aligned light beam reflected or transmitted from said forward and backward parts of said beam spot.

4. A magneto-optical disk reading apparatus comprising:

irradiating means for focusing a linearly polarized light beam and irradiating a recording medium, on which information is magneto-optically recorded in the form of successive recorded and non-recorded regions, with the focused beam;

a wave plate, arranged in a path of a light beam reflected or transmitted from an irradiated beam spot on said recording medium, for changing relative phases of differently polarized components in said reflected or transmitted light beam;

beam splitter means for splitting said reflected or transmited light beam after it has passes said wave plate, said reflected or transmitted light beam being split into two light beams which are linearly polarized in mutually orthogonal directions, each of said two light beams changing their intensity distributions in response to recorded information on said recording medium in a direction corresponding to the moving direction of said recording medium;

two photodetectors for detecting and giving outputs responsive to the two light intensities of said two light beams, respectively, at forward and backward positions reflected or transmitted from forward and backward parts of said irradiated beam spot, said forward and backward parts being taken relative to said moving direction of said recording medium;

two subtracting means for generating first and second difference signals each representing differences in the light intensities between said forward and backward positions of each of said two light beams; and circuit means for producing a third difference between said first and second difference signals, said third difference signal being supplied rom said circuit means and being provided as a basic signal or a reproduced signal of the magneto-optically recorded information when said focused beam hits the trailing or leading edge of said recorded region.

5. A magneto-optical disk reading apparatus according to claim 4, wherein said wave plate is a quarter-wave plate.

6. A magneto-optical disk reading apparatus according to claim 4, wherein said wave plate has a refractive index which is different polarized directions of said light beam.

7. A magneto-optical disk reading apparatus according to claim 2, wherein said wave plate varies its refractive index in accordance with the directions, in which said irradiated and linearly polarized light beam is polarized as it passes through said wave plate.

8. A magneto-optical disk reading apparatus according to claim 4, wherein each of said two photodetectors is divided into two portions for detecting the light beams from said beam splitter responsive to said forward and backward parts of said beam spot.

9. A magneto-optical disk reading apparatus comprising:

laser beam emitting means for emitting a first laser beam;

laser driving means for driving said laser beam emitting means;

collimator means for collimating said first laser beam into a collimated laser beam;

polarizing means for aligning polarization of said collimated laser beam in a certain direction;

convergent lens means for converging said collimated laser beam from said polarizing means, irradiating the surface of a medium having information recorded thereon in the form of successive recorded and non-recorded regions, the converged collimated laser beam appearing as a beam spot of light on said irradiated surface, said information recorded on said medium having an effect upon the directions in which the reflected or passed light beam is polarized, said laser beam reflected from or passed through said medium having forward and backward portions corresponding to forward and backward parts of said beam spot, said forward and backward parts being taken relative to a direction in which said medium moves;

beam splitter means for splitting and separating said laser beam passed through said convergent lens means from said reflected or transmitted light beam;

wave plate means for changing the phases of polarized components of said split and separated laser beam in accordance with the polarized direction thereof;

analyzer means for combining differently polarized components of the laser beam having phases changed by said wave plate means to cause interference between said parallel laser beams;

photodetector means for generating first and second electrical signals corresponding to the intensities of said forward and backward portions of the laser beam from said analyzer means;

subtractor means for generating a difference signal between the said first and second electrical signals; and processor means for reproducing information recorded on said medium on the basis of the difference signal generated by said subtractor means when said beam spot hits the leading or trailing each of said recorded regions.

10. An apparatus according to claim 9, wherein said wave plate means is a quarter-wave plate which changes the phase of said laser beam from said convergent lens means by 90°.

11. An apparatus according to claim 9, wherein said wave plate means has a characteristic which give a different refractive index which is different for different polarized direction components in said laser beam passed through said convergent lens means.

12. An apparatus according to claim 9, wherein said beam splitter means in a non-polarizing half mirror.

13. An apparatus according to claim 9, wherein said photo detector means has two detectors for detecting the light beams of said forward and backward parts of said laser beam reflected from or passed through said medium.

14. A magneto-optical disk reading apparatus comprising:

laser beam emitting means for emitting a laser beam;

laser driving means for driving said laser beam emitting means;

collimator means for collimating said laser beam into a collimated laser beam;

polarizing means for aligning in a certain direction a polarization of said collimated laser beam;

convergent lens means for converging said collimated laser beam from said polarizing means, said lens means irradiating the surface of a recording medium, on which information is magneto-optically recorded in the form of successive recorded and non-recorded regions, with the converged and collimated laser beam to provide a beam spot of light on said surface and converting a laser beam resulting from said beam spot which is reflected from or passed through the medium in order to provide a parallel laser beam;

wave plate means for changing a phase of said parallel laser beam passing through said wave plate means in accordance with the polarization direction, which has been changed by the magneto-optically recorded information on said recording medium, of said parallel laser beam;

beam splitter means for splitting the laser beam passing through said wave plate means into first and second split laser beams having a 90° shift of phases;

first and second photodetector means for detecting light intensities of forward and backward portions of said first and second split laser beams, respectively, said forward and backward portions corresponding to forward and backward parts of said beam spot, respectively, and said forward and backward parts being taken relative to the moving direction of said recording medium;

first and second subtracting means for generating first and second difference signals representing differences in the light intensities between said forward and backward portions of said first and second split laser beams, respectively;

third subtractor means for generating a third difference signal in response to said first and second difference signals generated by said first and second subtractor means; and processor means for reproducing information recorded on said medium on the basis of said third difference signal of said third substractor means when said beam spot hits the leading or trailing edge of each of said recorded regions on said recording medium.

15. An apparatus according to claim 14, wherein said wave plate means is a quarter-wave plate which has a characteristic which causes an extraordinary light component in said parallel laser beam to optically shift of 90° phase delay relative to an ordinally light component in said parallel laser beam, said extraordinary light component being linearly polarized in the orthogonal direction with respect to said ordinary light component.

16. An apparatus according to claim 14, wherein said wave plate means convert a linearly polarized laser beam into a circular polarized laser beam or a circular polarized laser beam into a linearly polarized laser beam.

* * * * *